(12) United States Patent
Chang et al.

(10) Patent No.: US 7,302,053 B2
(45) Date of Patent: Nov. 27, 2007

(54) SYSTEM AND METHOD FOR PROVIDING A COMMUNICATION SESSION

(75) Inventors: Rong Chang, Pleasantville, NY (US); Xiaohui Gu, Urbana, IL (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 10/725,309

(22) Filed: Dec. 1, 2003

(65) Prior Publication Data

US 2005/0129026 A1 Jun. 16, 2005

(51) Int. Cl.
H04M 7/00 (2006.01)
(52) U.S. Cl. .................... 379/220.01; 379/387.01; 379/201.01; 379/93.01; 370/260
(58) Field of Classification Search ........... 379/220.01, 379/387.01, 201.01, 93.01; 370/260
See application file for complete search history.

(56) References Cited

U.S. PATENT DOCUMENTS

| 2003/0108002 A1 | 6/2003 | Chaney et al. ............. 370/261 |
| 2003/0187992 A1 | 10/2003 | Steenfeldt et al. .......... 709/227 |
| 2004/0170164 A1* | 9/2004 | LeBlanc et al. ............ 370/389 |
| 2004/0176085 A1* | 9/2004 | Phillips et al. ............. 455/418 |
| 2004/0252675 A1* | 12/2004 | Lund ......................... 370/352 |

FOREIGN PATENT DOCUMENTS

| WO | WO 02/093851 A1 | 11/2002 |
| WO | WO 03/049459 | 6/2003 |

OTHER PUBLICATIONS

International Preliminary Report on Patentability dated Apr. 4, 2006 for International Application No. PCT/EP2004/053073.
Casati. et al. "Adaptive and Dynamic Service Composition in eFlow". HP Technique Report HPL-2000-39. Mar. 2000.
Fu et al., "CANS: Composable. Adaptive Network Services Infrastructure". Proc. of 3rd USENIX Sympsium on Internet Technologies and Systems. Mar. 2001.
Raman et al., "An Architecture for Highly Available Wide-Area Service Composition", Computer Communications Journal. Special Issue on Recent Advances in Communication Networking. May 2003.

* cited by examiner

Primary Examiner—Quynh H. Nguyen
(74) Attorney, Agent, or Firm—F. Chau & Associates, LLC; Michael F. Morano

(57) ABSTRACT

A communications system includes a plurality of service providers, and at least one management unit, wherein the at least one management unit selects at least one service provider of the plurality of service providers and utilizes at least one service of the at least one service provider to provide a communication session to at least one end user.

57 Claims, 5 Drawing Sheets

SYSTEM AND METHOD FOR PROVIDING A COMMUNICATION SESSION

BACKGROUND OF THE INVENTION

1. Technical Field

The present disclosure relates to Information Technology (IT) services, and more particularly, relates to Internet Telephony including Voice over Internet Protocol (VoIP) conferencing services and two party call services and the management of same.

2. Discussion of the Related Art

Various types of VoIP services are known, including conferencing services and point-to-point two-party call services, wherein the Internet may be used for transmission of telephone calls. Each known VoIP service provider has its own management system to monitor and manage voice quality. Also, known service providers have their own service domain, so that all resources for a specific VoIP service belong to a single service provider. As a result, users of VoIP services are forced to work with a single VoIP service provider when using a specific VoIP service. Services or resources provided by service providers may include segments of a managed quality of service (QoS) VoIP network, a VoIP access network, and conference mixers (e.g., audio conference mixers).

It is also known that Internet architecture has provided users a rich set of choices among the various VoIP service providers. Indeed, Internet access and availability has become so pervasive that the majority of VoIP service providers are able to reach most machines that have access to the Internet. However, due to the lack of a standard based VoIP service mechanism and management system that can govern various service providers, VoIP services are still governed by individual service providers so that prices and quality of service remain dependent on each individual service provider.

The dependency on individual service providers can result in poor quality VoIP conference services. For example, an individual VoIP conference service provider may not be able to provide a sufficient number of conference servers for complete geographical coverage of a conference call. As a result, a large part of the conference voice data path may go across the Internet uncontrolled, resulting in loss of voice quality. Consequently, conference users suffer higher cost and lower quality of service.

Similarly, it is difficult to control quality with peer-to-peer (two-party) VoIP services when the routing path cannot be controlled. For example, as shown in FIG. 1, in a conventional method of voice quality measurement, a User A sends a set of voice packet probes to User B across a free routing path of the Internet 10. By comparing the sent and received probe packets, voice quality can be measured based on some pre-defined matrices such as packet delay, loss and jitter. The IP protocol can successfully deliver the packets from the source to the destination if we know the IP address of the destination. However, an IP source routing protocol is not able to specify a routing path from the source to the destination due to a lack of knowledge of the IP addresses along a routing path. As a result, a routing path and its effects on the quality of service cannot be controlled.

Therefore, there exists a need for a standard management mechanism and protocol for VoIP services that can go across one or more service providers, so that resources of multiple service providers may be virtualized. As a result, VoIP service providers will be able to fully utilize their unused resources, and users can receive low cost and high quality service.

SUMMARY OF THE INVENTION

A communications system, in accordance with an embodiment of the present invention, includes a plurality of service providers, and at least one management unit, wherein the at least one management unit selects at least one service provider of the plurality of service providers and utilizes at least one service of the at least one service provider to provide a communication session to at least one end user.

The communication session may be a VoIP session including at least one of a conference call and a point-to-point call. The at least one end user may contact the at least one management unit through an access network, wherein the access network includes at least one of a wireless LAN, a LAN, the Internet, a cable network, a cable gateway, a telephone company network, a public switched telephone network, a wireless network and a wireless gateway. A signaling protocol of the system may be session initiation protocol.

Each service provider of the plurality of service providers may provide at least one VoIP service. Services of each service provider of the plurality of service providers may be divided into service segments based on a predetermined criterion, wherein the predetermined criterion includes at least one of service location, service type, service duration, service timing and service quality.

The at least one management unit may virtualize services of the at least one service provider and at least one other service provider of the plurality of service providers according to at least one service level agreement. The at least one service level agreement may be at least one of between the at least one service provider and the at least one other service provider, between the at least one management unit and the at least one service provider and between the at least one management unit and at least one other management unit. The system may also include a service level agreement between the at least one end user and an access network. The at least one management unit may work collaboratively with at least one other management unit to virtualize services provided by the at least one service provider and at least one other service provider of the plurality of service providers. Each service provider of the plurality of service providers may be capable of providing at least one service for the communication session without knowledge of the communication session.

The at least one management unit may include an authorization unit for at least one of identifying the at least one end user, determining rights of the at least one end user to request the communication session, and triggering a billing process. The at least one management unit may include a path calculation unit for at least one of calculating an optimal voice path, selecting the at least one service provider, and selecting a master management unit from the at least one management unit and at least one other management unit. Calculation of the optimal voice path and selection of the at least one service provider may be based on at least one of a service level agreement, and session performance information. The session performance information may include at least one of voice quality information, communication link status information and resource status information. The at least one management unit may include a monitor unit for at least one of measuring voice quality for the communication session, defining service boundaries, and defining at least one service level agreement for the communication session. The at least one management unit may include a database unit for storing at least one of service level agreement information, and session performance information.

The at least one management unit may include a path setup unit for setting up an optimal voice path. The at least one service provider may include at least one access point accessible under at least one service level agreement. The optimal voice path may include at least one linear branch including the at least one service provider or the at least one service provider connected with at least one other service provider of the plurality of service providers. The at least one management unit may include a communication unit for communicating between the at least one management unit and at least one other management unit.

The path calculation unit may use performance information gathered by the monitor unit to at least one of calculate the optimal voice path and select the at least one service provider.

A method for providing a communication session, in accordance an embodiment of the present invention, includes accessing at least one server for managing the communication session, selecting at least one service provider of a plurality of service providers, and utilizing at least one service of the at least one service provider to provide the communication session to at least one end user.

The communication session may be a VoIP session including at least one of a conference call and a point-to-point call. The method may include using session initiation protocol as a signaling protocol, dividing services of each service provider of the plurality of service providers into service segments based on a predetermined criterion, wherein the predetermined criterion includes at least one of service location, service type, service duration, service timing and service quality.

The method may also include virtualizing services of the at least one service provider and at least one other service provider of the plurality of service providers according to at least one service level agreement, wherein the at least one service level agreement is at least one of between the at least one service provider and the at least one other service provider, between the at least one server for managing the communication session and the at least one service provider, and between the at least one server for managing the communication session and at least one other server for managing the communication session.

The method may also include identifying the at least one end user, determining rights of the at least one end user to request the communication session, triggering a billing process, calculating an optimal voice path, setting up the optimal voice path, measuring voice quality for the communication session, defining service boundaries, and defining at least one service level agreement for the communication session. At least one of measured voice quality, the service boundaries and the at least one service level agreement may be used to calculate an optimal voice path. The method may also include storing at least one of service level agreement information, and data regarding voice quality over at least one voice path. Setting up the optimal voice path may include establishing a first connection between the at least one service provider and the at least one server for managing the communication session, establishing a second connection between the at least one service provider and at least one other service provider of the plurality of service providers, and establishing a third connection between the at least one other service provider and at least one other server for managing the communication session. The at least one service provider and the at least one other service provider may each include at least one access point accessible under at least one service level agreement.

The method may also include establishing a communication line between the at least one server for managing the communication session and at least one other server for managing the communication session.

In an embodiment of the present invention, a program storage device readable by a machine, tangibly embodies a program of instructions executable by the machine to perform method steps for providing a communication session. The method steps include selecting at least one service provider of a plurality of service providers, and utilizing at least one service of the at least one service provider to provide the communication session to at least one end user.

The communication session may be a VoIP session including at least one of a conference call and a point-to-point call. The program storage device may also include instructions for using session initiation protocol as a signaling protocol, for dividing services of each service provider of the plurality of service providers into service segments based on a predetermined criterion, wherein the predetermined criterion includes at least one of service location, service type, service duration, service timing and service quality.

The program storage device may also include instructions for virtualizing services of the at least one service provider and at least one other service provider of the plurality of service providers according to at least one service level agreement, wherein the at least one service level agreement is at least one of between the at least one service provider and the at least one other service provider, between at least one server for managing the communication session and the at least one service provider, and between the at least one server for managing the communication session and at least one other server for managing the communication session.

The program storage device may also include instructions for identifying the at least one end user, determining rights of the at least one end user to request the communication session, triggering a billing process, calculating an optimal voice path, setting up the optimal voice path, measuring voice quality for the communication session, defining service boundaries, defining at least one service level agreement for the communication session, and using at least one of measured voice quality, the service boundaries and the at least one service level agreement to calculate an optimal voice path. The program storage device may also include instructions for storing at least one of service level agreement information, and session performance information, wherein the session performance information may include at least one of voice quality information, communication link status information and resource status information.

Setting up the optimal voice path may include establishing a first connection between the at least one service provider and at least one server for managing the communication session, establishing a second connection between the at least one service provider and at least one other service provider of the plurality of service providers, and establishing a third connection between the at least one other service provider and at least one other server for managing the communication session. The at least one service provider and the at least one other service provider may each include at least one access point accessible under at least one service level agreement.

The program storage device may also include instructions for establishing a communication line between the at least one server for managing the communication session and at least one other server for managing the communication session.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
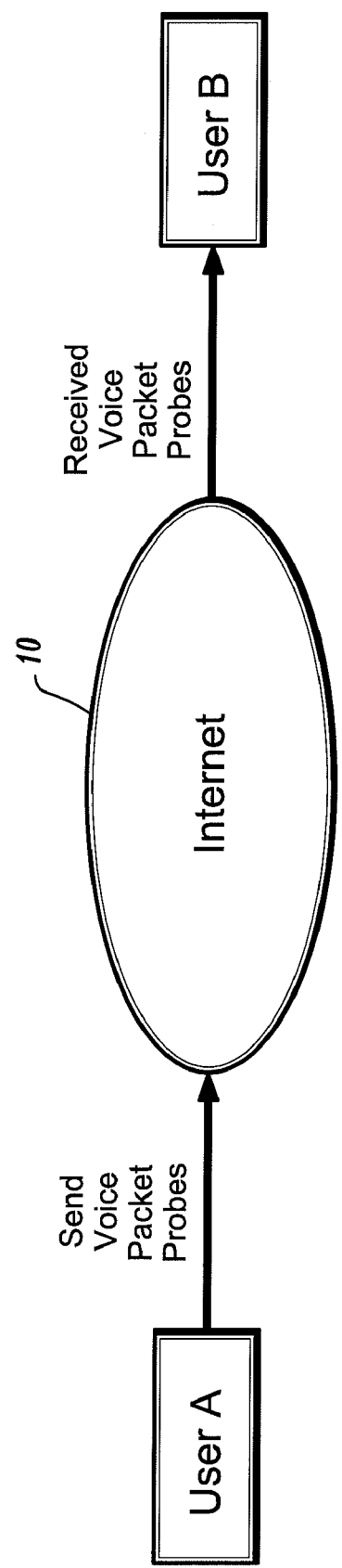
FIG. 1 is a block diagram for use in illustrating a conventional method of voice quality measurement.
Figure 2:
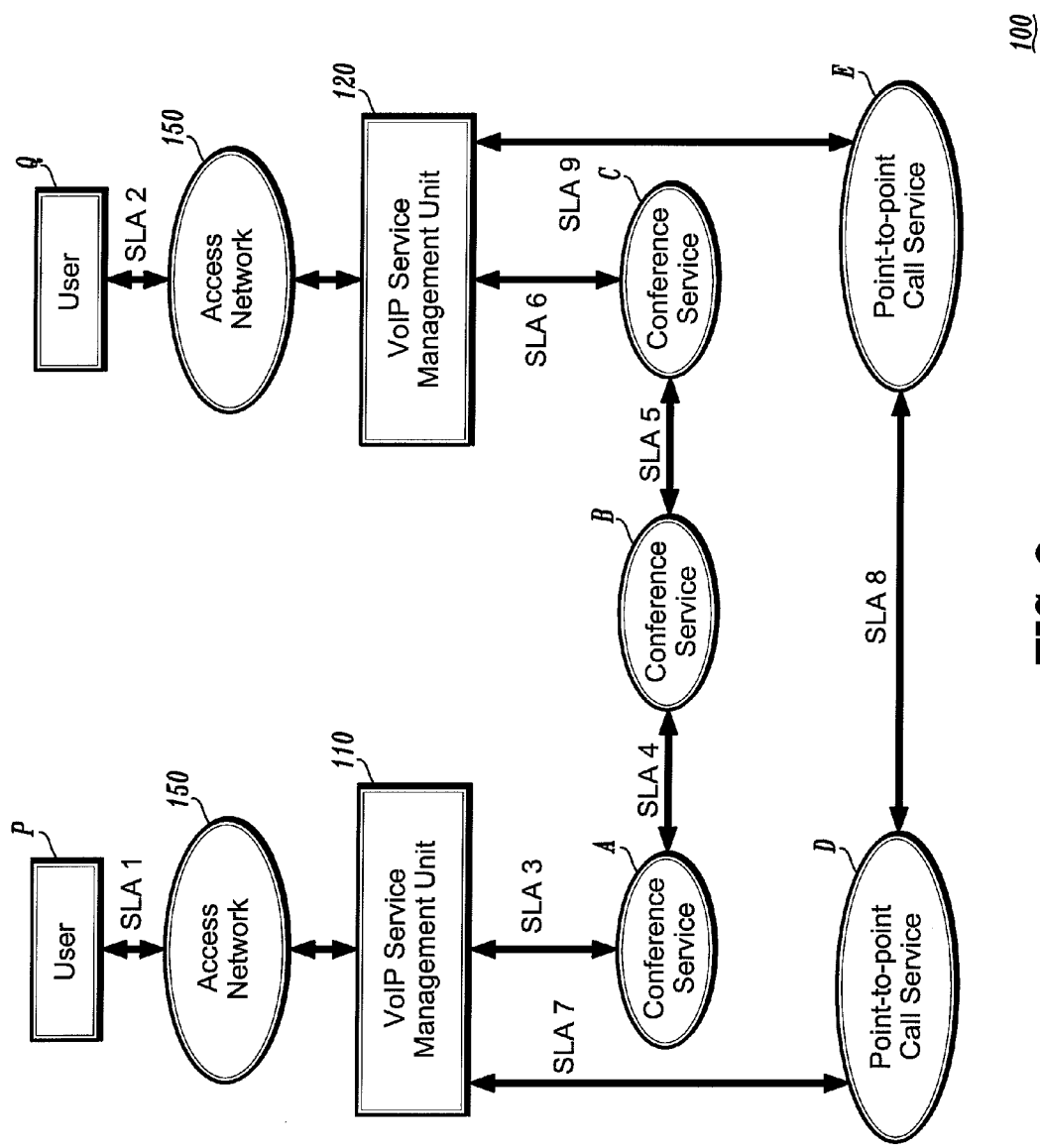
FIG. 2 is a block diagram showing a management architecture for VoIP services, according to an embodiment of the present invention.

Referring to FIG. 2, a VoIP service management framework for VoIP services 100, (e.g., VoIP conferencing and point-to-point two party calls), according to an embodiment of the present invention, includes a plurality of VoIP service management units, for example, VoIP service management units 110 and 120, that may be distributed across the Internet. The service management framework 100 makes use of standard Session Initiation Protocol (SIP) as the signaling protocol, but may use any known format for transmission of data.

Figure 3:
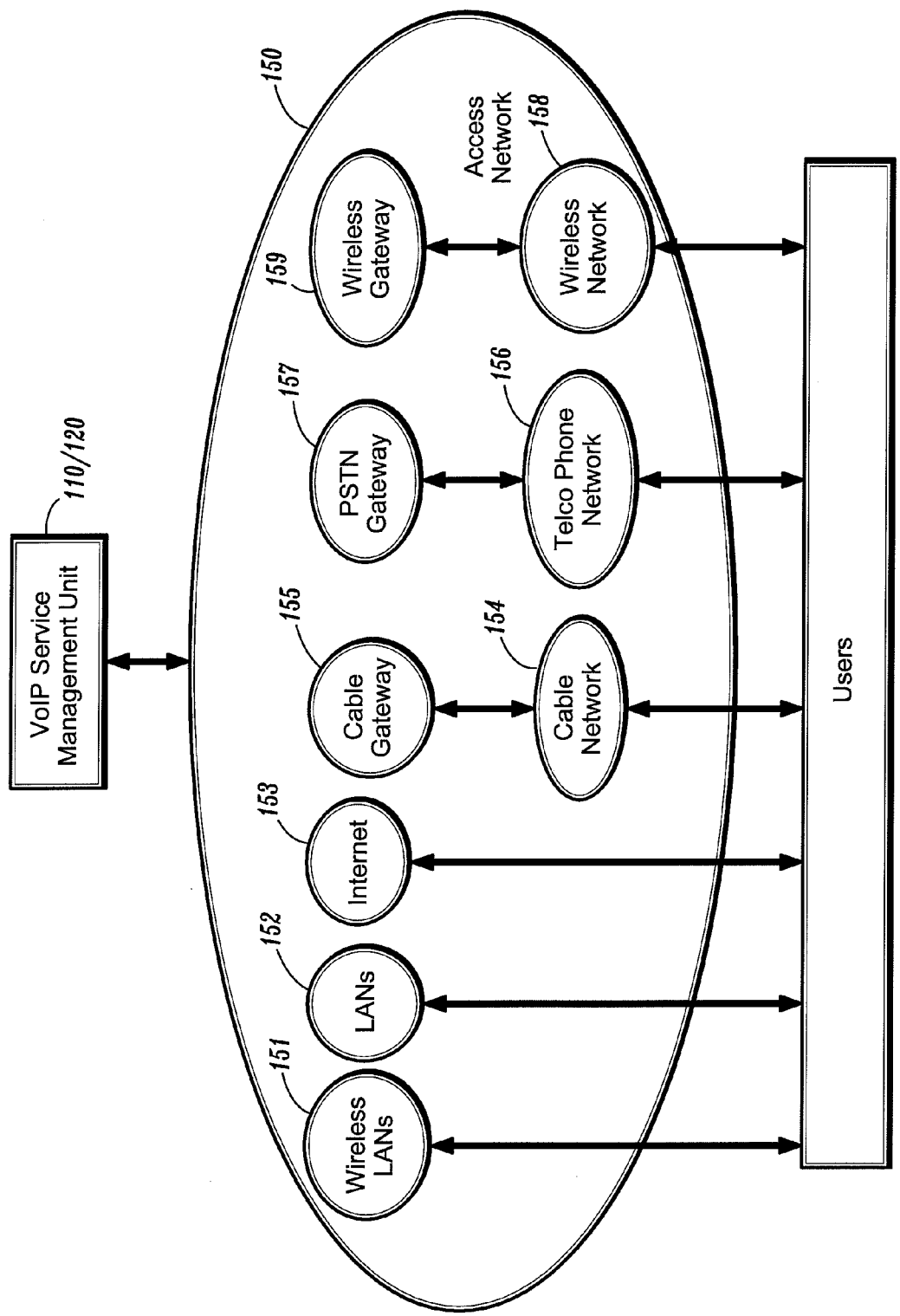
FIG. 3 is a block diagram showing VoIP services access networks, according to an embodiment of the present invention.

As shown in FIG. 3, users may contact a VoIP service management unit 110, 120 through various access networks 150 for the VoIP related services. The access network 150 can be, for example, a wireless LAN 151, a LAN 152, the Internet 153, a cable network 154, a cable gateway 155, a telephone company (Telco) phone network 156, a public switched telephone network (PSTN) 157, a wireless network 158, a wireless gateway 159 or any combination of the foregoing.

Using service level agreements (SLAs) among various individual service providers, service components, and/or the service management units, the VoIP service management units 110, 120 work collaboratively to virtualize (i.e., pool) the VoIP resources and services available to them from multiple service providers. In general, an SLA is a contract including stipulations defining the provision of services by a service provider. SLAs disclosed herein may include provisions defining the virtualization or allocation of resources and services among service providers. For example, the resources and services associated with conference services A, B and C are no longer restricted to users of conference services A, B and C, respectively. According to an embodiment of the present invention, a user is no longer required to work exclusively with service A, B or C to obtain the VoIP resources and services associated with service A, B or C, respectively. Instead, the services and resources of conference services A, B and C can be freely allocated and made available for a VoIP session, as needed, based on SLAs 1-6. Similarly, the resources and services associated with point-to-point call services D and E can be freely allocated for a VoIP session based on SLAs 1, 2 and 7-9.

According to an embodiment of the present invention, each individual service provider (e.g., conference services A, B and C) divides its VoIP services into service segments based on some criterion, for example, geographical location within the Internet, type of service, duration of service, timing of the service (e.g., when a service is needed during a communication session) and/or quality of service. Each service segment can be made available as a separate and individual component of the overall VoIP service so that a VoIP service provider can more efficiently utilize or allocate its unused resources.

The SLAs 1 and 2 represent overall SLAs for VoIP services that are provided to user P and user Q, respectively by the service management units 110 and 120. If the user P (SLA 1) and user Q (SLA 2) have different overall SLAs granting different rights, the SLA that ultimately governs a telephony session may be, for example, the SLA belonging to the user who is paying the service charge for the session.

The VoIP service management units 110, 120 provide service frameworks that separate service management functions from service provisioning functions. As a result, VoIP resources/services are reusable and users do not have to lock into individual service providers A-E. Also, the service providers A-C or D-E, for example, can combine their resources and services to cover all geographical areas. Conceptually, every VoIP service can be viewed as a utility that can be reused and composed. VoIP resources/services virtualization via VoIP service management units makes the communications system scalable and more reliable. Moreover, end users can enjoy lower cost and higher quality of service.

Depending on the situation, a VoIP management unit 110 or 120 may select a single service provider for a given VoIP conference session or the management unit 110 or 120 may select multiple conference service providers to work collaboratively for the same conference session. In the situation where multiple service providers are used, each conference service provider may work independently without knowledge of the overall conference session. Also, management unit software may be updated automatically to account for new or different SLAs.

Figure 4:
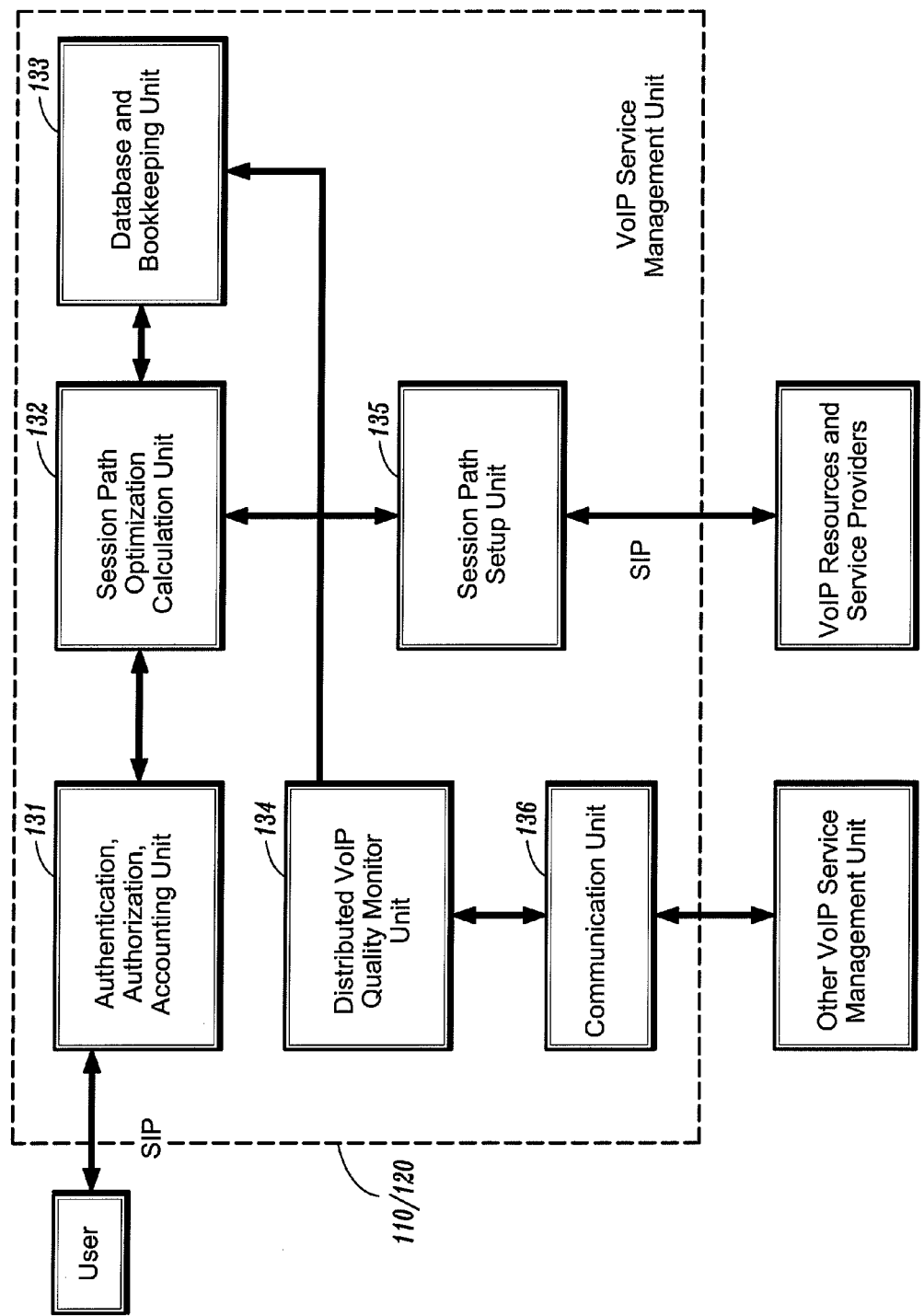
FIG. 4 is a block diagram showing a VoIP service management unit, according to an embodiment of the present invention.

Referring to FIG. 4, a VoIP management unit 110/120 includes an authentication, authorization and accounting unit 131, a session path optimization calculation unit 132, a database and bookkeeping unit 133 for storing and updating all the session related information, a distributed VoIP quality monitor unit 134, a session path setup unit 135, and a communication unit 136 to communicate with other management units.

When the VoIP service management unit 110/120 receives a service request from a user, the service management unit 110/120 performs authentication, authorization and accounting using the authentication, authorization and accounting unit 131. Authentication, authorization and accounting are performed to identify users and their right to request the service, and to trigger the billing process. In general, a user will make use of SIP protocol to initiate a VoIP service request. Authentication, authorization and accounting may be performed by any methods known to those of ordinary skill in the art. For example, a known protocol, such as RADIUS, may be used.

The session path optimization calculation unit 132 calculates an optimal voice path and selects the service providers based on SLAs and the session performance information gathered by the distributed quality monitor unit 134 (explained further below). The session performance information may include voice quality, communication link status information, and/or resource status information, including mean opinion score (MOS), bandwidth usage, packet lose rate and resource usage. Preferably, information regarding the SLAs and session performance is monitored by and stored in each service management unit. The information may be, for example, stored in the database and bookkeeping unit 133. The database and bookkeeping unit 133 is capable of storing all of the available SLA information (e.g., provisions of SLAs) and session performance information. The data is used by the session path optimization calculation unit 132 to calculate the optimal voice path. Any suitable optimization algorithm known to those of ordinary skill in the art can be employed for this calculation, such as, for example, Dijkstra's algorithm.

The session path optimization calculation unit 132 also arbitrarily selects one of the management units of the path as the master management unit of the session.

The distributed VoIP quality monitor unit 134 measures voice quality of a VoIP service request session. The voice quality corresponds to the quality of the service and the SLA or SLAs for the request session. A plurality of distributed VoIP quality monitor units 134 of each service management unit (e.g., 110 and 120) define quality assured service boundaries, thereby making it possible to define or compose an SLA or SLAs for the VoIP service session without help from a user agent. As a result, user devices do not require any special performance monitoring tools. Moreover, users may make use of any standard SIP software to request the service and obtain the SLA including service boundaries defined by the management units.

In the event that there is a management user agent (e.g., an embedded Java application running inside a standalone VoIP phone) stored or installed in the user device, and there is an SLA available in the access network 150, then the quality-assured boundary can be extended from the management unit to an end-user. Therefore, the distributed voice quality monitor units 134 can be used to obtain an end-to-end service SLA, end-to-end performance management, and end-to-end voice quality measurement.

As stated above, the session performance information gathered by the distributed voice quality monitor unit 134 is used by the session path optimization calculation unit 132 to calculate an optimal voice path and to select the service providers. Accordingly, a quality-assured VoIP service having a controlled voice path, wherein VoIP quality is measured and monitored, can be established. The distributed voice quality monitor unit 134 may continue to monitor voice quality after the optimal voice path has been set up.

Figure 5:
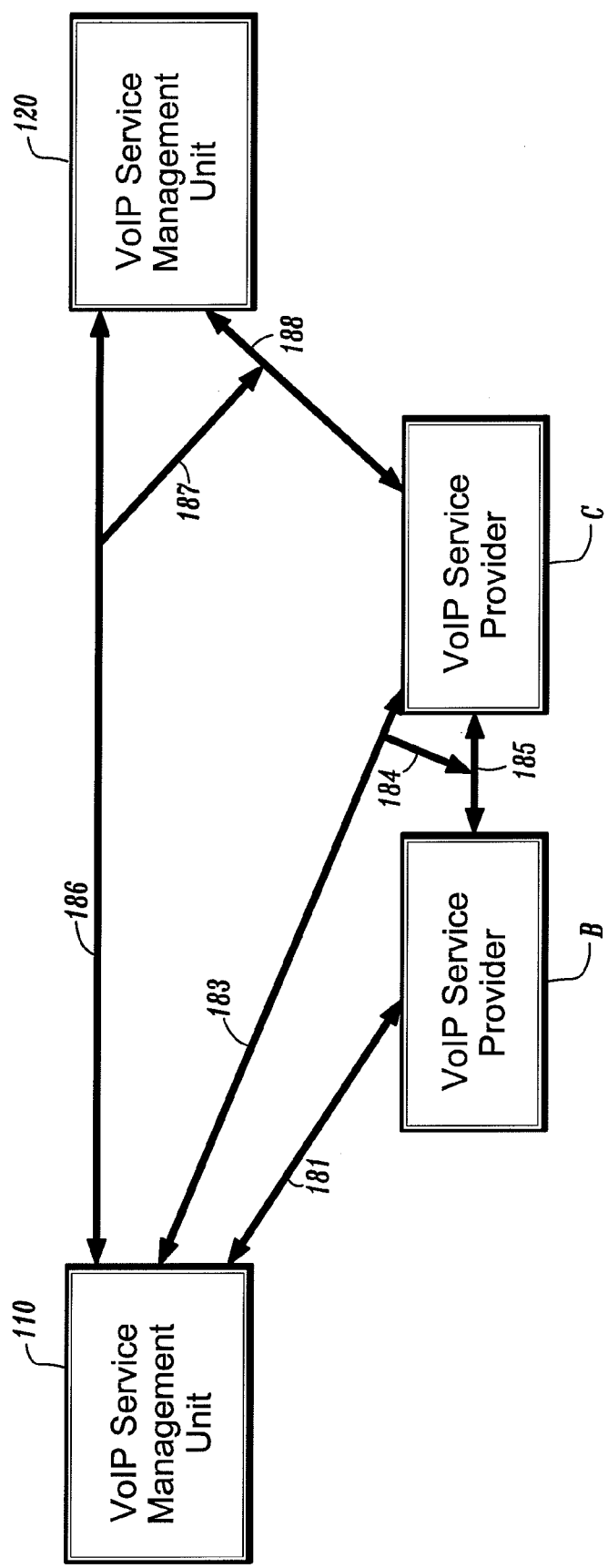
FIG. 5 is a block diagram showing a session path setup procedure, according to an embodiment of the present invention.

Referring to FIG. 5, whenever a management unit 110/120 makes a determination to send voice packet probes along a specific route, the management unit 110/120 utilizes the session path setup and modification unit 135 to set up the route between the management units 110/120. The probe packet can follow the path defined in the session path setup unit 135, and, consequently, the voice quality of the selected path can be measured.

The session path setup unit 135 sets up a path chosen by the session path optimization calculation unit 132. Each VoIP service provider should provide a set of service access points that can be accessed under the SLA contracts so that movement of data along the established path can occur. A standard interface and application program interface (API), as well as SIP may be used for session path setup.

As shown in FIG. 5, management units 110 and 120 and service providers B and C are in the chosen path. A chosen path may include more or less management units and service providers. For purposes of this example, management unit 110 is the chosen master of the session.

Management unit 110 sends an INVITE message (step 181) with a specific session identifier (ID) to a service access point of service provider B, setting up a connection between the management unit 110 and the service provider B. The service access point preferably works with an open industry standard protocol and interface method, such as SIP. The service access point may be part of a service segment from a service provider. The management unit 110 sends another INVITE message (step 183) with the same session ID to a service access point of service provider C, setting up a connection between the management unit 110 and the service provider C. The management unit 110 then sends a REFER message (step 184) to service provider C, requesting service provider C to replace the connection between the management unit 110 and the service provider C with a connection between service provider B and service provider C (step 185). The management unit 110 sends another INVITE message (step 186) with the same session ID to management unit 120, establishing a connection between management units 110 and 120. Management unit 110 then sends a REFER message (step 187) to management unit 120, requesting management unit 120 to replace the connection between management units 110 and 120 with a connection between management unit 120 and service provider C (step 188). Since all the connections are set up with the same session ID, the voice path will be setup between management unit 110, service providers B and C, and management unit 120 for the given session. The voice paths inside service providers B and C are hidden in accordance with the SLAs corresponding to same so that there may be one or more service segments with unknown IP addresses in the path.

Ultimately, every VoIP service user of a particular session only needs to connect to one service management unit to access VoIP services. Further, each management unit involved in a session ultimately needs to connect to at least one service provider or resource and the involved service providers form a linear session voice path depending on the number of users. Test probe voice packets may traverse across a voice path to measure voice quality of the given path.

Referring back to FIG. 4, the communication unit 136 is the communication channel to other management units and to the Internet. Each management unit makes use of the communication unit 136 to update and synchronize the information stored in the database and bookkeeping unit 133, as well as to select a master management unit for a given session. The communication unit 136 uses, for example, transmission control protocol/Internet protocol (TCP/IP) to communicate session information and select the master management unit.

URLs of VoIP management units that allow users access thereto can be publicized via well known means, such as, for example, web services publications. Users can be free to select VoIP management service units, based on, for example, company policy, local policy, or cost. In some situations, a specified conference ID may be used to allow a management unit to discover collaborating management units hosting the same conference and to find one or more conference service providers or resources for hosting the conference session. In the case of a point-to-point two party VoIP call service, a management unit can discover the peer end management unit from destination information carried in an SIP message, and locate one or more point-to-point call service providers for hosting the session.

In sum, a service mechanism, framework, and architecture, based on standard SIP protocol, is disclosed to enable low cost, and better quality of VoIP services. A scalable VoIP service management system governing various VoIP services and resources in order to create a new VoIP service model is disclosed, wherein the service model is capable of utilizing one or more service providers or resources at lower cost with higher quality service. Each individual VoIP service provider can more efficiently utilize its unused resources as individual service components for the overall VoIP service. Moreover, each individual VoIP service provider can sell its VoIP resources to other service providers based on SLAS, without knowledge of the VoIP sessions that end users are experiencing.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A communications system, comprising:
a plurality of service providers; and
at least one management unit, wherein the at least one management unit selects at least one service provider of the plurality of service providers and utilizes at least one service of the at least one service provider to provide a communication session to at least one end user, wherein the at least one management unit works collaboratively with at least one other management unit to virtualize services provided by the at least one service provider and at least one other service provider of the plurality of service providers, and wherein the communication session is a VoIP session across multiple service providers.

2. The communications system as recited in claim 1, wherein the VoIP session include at least one of a conference call and a point-to-point call.

3. The communications system as recited in claim 1, wherein the at least one end user contacts the at least one management unit through an access network.

4. The communications system as recited in claim 3, wherein the access network includes at least one of a wireless LAN, a LAN, the Internet, a cable network, a cable gateway, a telephone company network, a public switched telephone network, a wireless network and a wireless gateway.

5. The communications system as recited in claim 1, wherein a signaling protocol of the communications system is session initiation protocol.

6. The communications system as recited in claim 1, wherein each service provider of the plurality of service providers is capable of providing at least one VoIP service.

7. The communications system as recited in claim 1, wherein services of each service provider of the plurality of service providers are divided into service segments based on a predetermined criterion.

8. The communications system as recited in claim 7, wherein the predetermined criterion includes at least one of service location, service type, service duration, service timing and service quality.

9. The communications system as recited in claim 1, wherein the at least one management unit virtualizes services of the at least one service provider and at least one other service provider of the plurality of service providers according to at least one service level agreement.

10. The communications system as recited in claim 9, wherein the at least one service level agreement is at least one of: between the at least one service provider and the at least one other service provider; between the at least one management unit and the at least one service provider; and between the at least one management unit and the at least one other management unit.

11. The communications system as recited in claim 1, further comprising a service level agreement at least one of: between the at least one service provider and at least one other service provider of the plurality of service providers; between the at least one management unit and the at least one service provider; between the at least one management unit and the at least one other management unit; and between the at least one end user and an access network.

12. The communications system as recited in claim 1, wherein each service provider of the plurality of service providers is capable of providing at least one service for the communication session without knowledge of the communication session.

13. The communications system as recited in claim 1, wherein the at least one management unit includes an authorization unit for at least one of identifying the at least one end user, determining rights of the at least one end user to request the communication session, and triggering a billing process.

14. The communications system as recited in claim 1, wherein the at least one management unit includes a path calculation unit for at least one of calculating an optimal voice path, selecting the at least one service provider, and selecting a master management unit from the at least one management unit and the at least one other management unit.

15. The communications system as recited in claim 14, wherein calculation of the optimal voice path and selection of the at least one service provider is based on at least one of a service level agreement, and session performance information.

16. The communications system as recited in claim 15, wherein the session performance information includes at least one of voice quality information, communication link status information and resource status information.

17. The communications system as recited in claim 1, wherein the at least one management unit includes a monitor unit for at least one of measuring voice quality for the communication session, defining service boundaries, and defining at least one service level agreement for the communication session.

18. The communications system as recited in claim 1, wherein the at least one management unit includes a database unit for storing at least one of service level agreement information, and session performance information.

19. The communications system as recited in claim 1, wherein the at least one management unit includes a path setup unit for setting up an optimal voice path.

20. The communications system as recited in claim 19, wherein the at least one service provider includes at least one access point accessible under at least one service level agreement.

21. The communications system as recited in claim 19, wherein the optimal voice path includes at least one linear branch including the at least one service provider or the at least one service provider connected with at least one other service provider of the plurality of service providers.

22. The communications system as recited in claim 1, wherein the at least one management unit includes a communication unit for communicating between the at least one management unit and the at least one other management unit.

23. The communications system as recited in claim 1, wherein the at least one management unit includes:
   a path calculation unit for at least one of calculating an optimal voice path and selecting the at least one service provider;
   a monitor unit for gathering performance information for the communication session; and
   a path setup unit for setting up the optimal voice path.

24. The communications system as recited in claim 23, wherein the path calculation unit uses the performance information gathered by the monitor unit to at least one of calculate the optimal voice path and select the at least one service provider.

25. A method for providing a communication session, comprising:
   accessing at least one management unit for managing the communication session;
   selecting at least one service provider of a plurality of service providers;
   utilizing at least one service of the at least one service provider to provide the communication session to at least one end user; and
   establishing a communication line between the at least one management unit for managing the communication session and at least one other management unit for managing the communication session, wherein the at least management unit works collaboratively with the at least one management unit to virtualize services provided by the at least one service provider and at least one other service provider of the plurality of service providers, and wherein the communication session is a VoIP session across multiple service providers.

26. The method as recited in claim 25, wherein the VoIP session includes at least one of a conference call and a point-to-point call.

27. The method as recited in claim 25, further comprising using session initiation protocol as a signaling protocol.

28. The method as recited in claim 25, wherein each service provider of the plurality of service providers is capable of providing at least one VoIP service.

29. The method as recited in claim 25, further comprising dividing services of each service provider of the plurality of service providers into service segments based on a predetermined criterion.

30. The method as recited in claim 29, wherein the predetermined criterion includes at least one of service location, service type, service duration, service timing, and service quality.

31. The method as recited in claim 25, further comprising virtualizing services of the at least one service provider and the at least one other service provider of the plurality of service providers according to at least one service level agreement.

32. The method as recited in claim 31, wherein the at least one service level agreement is at least one of: between the at least one service provider and the at least one other service provider; between the at least one management unit for managing the communication session and the at least one service provider; and between the at least one management unit for managing the communication session and the at least one other management unit for managing the communication session.

33. The method as recited in claim 25, wherein each service provider of the plurality of service providers is capable of providing at least one service for the communication session without knowledge of the communication session.

34. The method as recited in claim 25, further comprising at least one of identifying the at least one end user, determining rights of the at least one end user to request the communication session, and triggering a billing process.

35. The method as recited in claim 25, further comprising:
   calculating an optimal voice path; and
   setting up the optimal voice path.

36. The method as recited in claim 25, further comprising at least one of measuring voice quality for the communication session, defining service boundaries, and defining at least one service level agreement for the communication session.

37. The method as recited in claim 36, further comprising using at least one of measured voice quality, the service boundaries and the at least one service level agreement to calculate an optimal voice path.

38. The method as recited in claim 25, further comprising storing at least one of service level agreement information, and data regarding voice quality over at least one voice path.

39. The method as recited in claim 35, wherein setting up the optimal voice path includes:
   establishing a first connection between the at least one service provider and the at least one management unit for managing the communication session;
   establishing a second connection between the at least one service provider and at least one other service provider of the plurality of service providers; and
   establishing a third connection between the at least one other service provider and at least one other management unit for managing the communication session.

40. The method as recited in claim 39, wherein the at least one service provider and the at least one other service provider each include at least one access point accessible under at least one service level agreement.

41. A computer program storage device readable by a machine, tangibly embodying a computer program of instructions executable by the machine to perform method steps for providing a communication session, the method steps comprising:
   selecting at least one service provider of a plurality of service providers;
   utilizing at least one service of the at least one service provider to provide the communication session to at least one end user; and
   establishing a communication line between at least one management unit for managing the communication session and at least one other management unit for managing the communication session, wherein the at least one management unit works collaboratively with the at least one other management unit to virtualize services provided by the at least one service provider and at least one other service provider of the plurality of service providers, and wherein the communication session is a VoIP session across multiple service providers.

42. The computer program storage device as recited in claim 41, wherein the VoIP session includes at least one of a conference call and a point-to-point call.

43. The computer program storage device as recited in claim 41, further comprising instructions for using session initiation protocol as a signaling protocol.

44. The computer program storage device as recited in claim 41, wherein each service provider of the plurality of service providers is capable of providing at least one VoIP service.

45. The computer program storage device as recited in claim 41, further comprising instructions for dividing services of each service provider of the plurality of service providers into service segments based on a predetermined criterion.

46. The computer program storage device as recited in claim 41, wherein the predetermined criterion includes at least one of service location, service type, service duration, service timing, and service quality.

47. The computer program storage device as recited in claim 41, further comprising instructions for virtualizing services of the at least one service provider and the at least one other service provider of the plurality of service providers according to at least one service level agreement.

48. The computer program storage device as recited in claim 47, wherein the at least one service level agreement is at least one of: between the at least one service provider and the at least one other service provider; between the at least one management unit for managing the communication session and the at least one service provider; and between the at least one management unit for managing the communication session and the at least one other management unit for managing the communication session.

49. The computer program storage device as recited in claim 41, wherein each service provider of the plurality of service providers is capable of providing at least one service for the communication session without knowledge of the communication session.

50. The computer program storage device as recited in claim 41, further comprising instructions for performing at least one of identifying the at least one end user, determining rights of the at least one end user to request the communication session, and triggering a billing process.

51. The computer program storage device as recited in claim 41, further comprising instructions for performing the steps of:
calculating an optimal voice path; and
setting up the optimal voice path.

52. The computer program storage device as recited in claim 41, further comprising instructions for performing at least one of measuring voice quality for the communication session, defining service boundaries, and defining at least one service level agreement for the communication session.

53. The computer program storage device as recited in claim 52, further comprising instructions for using at least one of measured voice quality, the service boundaries and the at least one service level agreement to calculate an optimal voice path.

54. The computer program storage device as recited in claim 41, further comprising instructions for storing at least one of service level agreement information, and session performance information.

55. The computer program storage device as recited in claim 54, wherein the session performance information includes at least one of voice quality information, communication link status information and resource status information.

56. The computer program storage device as recited in claim 51, wherein setting up the optimal voice path includes:
establishing a first connection between the at least one service provider and the at least one management unit for managing the communication session;
establishing a second connection between the at least one service provider and the at least one other service provider of the plurality of service providers; and
establishing a third connection between the at least one other service provider and the at least one other management unit for managing the communication session.

57. The computer program storage device as recited in claim 56, wherein the at least one service provider and the at least one other service provider each include at least one access point accessible under at least one service level agreement.

* * * * *